United States Patent
Li et al.

(10) Patent No.: US 10,424,054 B2
(45) Date of Patent: Sep. 24, 2019

(54) LOW-ILLUMINATION IMAGE PROCESSING METHOD AND DEVICE

(71) Applicant: Peking University Shenzhen Graduate School, Shenzhen (CN)

(72) Inventors: Lin Li, Shenzhen (CN); Ronggang Wang, Shenzhen (CN); Chengzhou Tang, Shenzhen (CN); Zhenyu Wang, Shenzhen (CN); Wen Gao, Shenzhen (CN)

(73) Assignee: Peking University Shenzhen Graduate School, Shenzhen (CN)

( * ) Notice: Subject to any disclaimer, the term of this patent is extended or adjusted under 35 U.S.C. 154(b) by 160 days.

(21) Appl. No.: 15/736,403

(22) PCT Filed: Jun. 26, 2015

(86) PCT No.: PCT/CN2015/082486
§ 371 (c)(1),
(2) Date: Dec. 14, 2017

(87) PCT Pub. No.: WO2016/206087
PCT Pub. Date: Dec. 29, 2016

(65) Prior Publication Data
US 2018/0182074 A1    Jun. 28, 2018

(51) Int. Cl.
*G06T 5/00* (2006.01)
*G06T 7/11* (2017.01)
(Continued)

(52) U.S. Cl.
CPC ............. *G06T 5/003* (2013.01); *G06T 5/002* (2013.01); *G06T 7/11* (2017.01); *G06T 7/40* (2013.01);
(Continued)

(58) Field of Classification Search
None
See application file for complete search history.

(56) References Cited

U.S. PATENT DOCUMENTS

| 2006/0103621 | A1* | 5/2006 | Feng | G09G 3/3426 345/102 |
| 2010/0253833 | A1* | 10/2010 | Deever | H04N 5/3456 348/362 |

(Continued)

*Primary Examiner* — Zhiyu Lu
(74) *Attorney, Agent, or Firm* — SV Patent Service

(57) ABSTRACT

A low-illumination image processing method and device address the problem of noise amplification in existing contrast enhancement techniques when applied to original low-illumination image. A noise suppression filter is additionally arranged before an operation of contrast enhancement, and smoothing processing is performed on an inverse color image of a low-illumination image by adopting a first filtering coefficient and a second filtering coefficient, so that image contrast is enhanced while random noise is suppressed. Texture and noise level parameter of an image are calculated according to a local characteristic inside block of the image. Weighted averaging is performed on a first smoothing image and a second smoothing image after smoothing processing according to the texture and noise level parameters. The texture image is obtained by performing texture structure extraction on a gradient image of an inverse color image, and the texture image is combined with a weighted image to sharpen the weighted image, to have an effect of enhancing image details. Therefore, the contrast of low-illumination image can be effectively enhanced, various types of noise can be filtered, and the image color and details can be retained at the same time to obtain a clear and vivid restored image.

13 Claims, 3 Drawing Sheets

(51) Int. Cl.
*G06T 7/90* (2017.01)
*G06T 7/40* (2017.01)

(52) U.S. Cl.
CPC ...... *G06T 7/90* (2017.01); *G06T 2207/10016* (2013.01); *G06T 2207/10024* (2013.01); *G06T 2207/20076* (2013.01); *G06T 2207/20182* (2013.01); *G06T 2207/30232* (2013.01)

(56) References Cited

U.S. PATENT DOCUMENTS

| | | | | |
|---|---|---|---|---|
| 2011/0123133 A1* | 5/2011 | Mohanty | ................ | G06T 5/009 382/274 |
| 2014/0029850 A1* | 1/2014 | Meyers | .................... | G06T 5/50 382/167 |
| 2015/0063717 A1* | 3/2015 | Pavani | ................... | G06T 5/002 382/261 |

* cited by examiner

LOW-ILLUMINATION IMAGE PROCESSING METHOD AND DEVICE

TECHNICAL FIELD

The present invention relates to the field of digital image processing, and in particular, to a low-illumination image processing method and device.

BACKGROUND OF THE INVENTION

More and more surveillance cameras are used by people to guarantee security in cities, transportation, public places and other aspects, and car cameras are used to improve the safety of driving. However, due to low-illumination conditions (e.g., night, backlight, indoor, etc.), the performance of such cameras will be greatly reduce, so that the visibility of images and videos decreases, and it is difficult to identify key characters, objects and other information. The images taken in the above cases are called low-illumination images, and the low-illumination images have various kinds of noise, which becomes more prominent after image enhancement, reducing recognition of objects in the image. The subjective feelings of people are significantly compromised.

In traditional image enhancement techniques (such as defogging and low-illumination enhancement), the original noises in images will be greatly enhanced after image processing, and a lot of noises such as Color noise and Luma noise will occur in images. These noises cannot be effectively filtered with traditional image enhancement techniques.

The following two problems cannot be solved with traditional noise reduction methods:

1) Various types of Color noise can be effectively filtered, and the color saturation of object can be retained at the same time.

2) Various types of Luma noise can be filtered, and the image details can be retained at the same time.

SUMMARY OF THE INVENTION

A low-illumination image processing method and device are provided to solve the problem of noise amplification, loss of details and other problems in the processing original low-illumination images.

According to an aspect of the present invention, a low-illumination image processing method includes:

inputting a low-illumination image;

dividing the low-illumination image into different texture regions, calculating a local standard deviation and a gradient sum of the gray scale of pixel points in various texture regions, and calculating a ratio of the standard deviation and the gradient sum as the texture and noise level parameter of the image;

performing inverse color processing on the low-illumination image to obtain an inverse color image;

determining a first filtering coefficient and a second filtering coefficient according to the mean of the standard deviations of the gray scale of pixel points in various texture regions, and performing smoothing processing on an inverse color image by adopting the first filtering coefficient and the second filtering coefficient to obtain a first smoothing image and a second smoothing image respectively;

performing weighted averaging on the first smoothing image and the second smoothing image according to the texture and noise level parameter to obtain a weighted image;

calculating a dark channel image of the weighted image, and estimating environment illumination intensity according to the dark channel image;

calculating a contrast enhancement coefficient according to the dark channel image and the environment illumination intensity;

calculating a gradient image on the inverse color image, and performing texture structure extraction on the gradient image of the inverse color image to obtain a texture image;

combining the texture image with the weighted image to obtain a sharpened image;

performing contrast enhancement on the sharpened image according to the environment illumination intensity and the contrast enhancement coefficient to obtain an enhanced image; and performing inverse color processing on the enhanced image to obtain an output image.

According to another aspect of the present invention, a low-illumination image processing device is provided in the present invention, comprising:

an input module that inputs a low-illumination image;

an image segmentation module that divides the low-illumination image into different texture regions;

a first calculation module that calculates a local standard deviation and a gradient sum of the gray scale of pixel points in various texture regions, and calculating a ratio of the standard deviation and the gradient sum as the texture and noise level parameter of the image;

a first inverse color module that performs inverse color processing on the low-illumination image to obtain an inverse color image;

a smoothing filtering module that determines a first filtering coefficient and a second filtering coefficient according to the mean of the standard deviations of the gray scale of pixel points in various texture regions, and performs smoothing processing on an inverse color image by adopting a first filtering coefficient and a second filtering coefficient to obtain a first smoothing image and a second smoothing image respectively;

a weighting module configured to perform weighted averaging on the first smoothing image and the second smoothing image according to the texture and the noise level parameter to obtain a weighted image;

a second calculation module that calculates a dark channel image on the weighted image, and estimates environment illumination intensity according to the dark channel image, and calculates a contrast enhancement coefficient according to the dark channel image and the environment illumination intensity;

a third calculation module that calculates a gradient image on the inverse color image, and performs texture structure extraction on the gradient image of the inverse color image to obtain a texture image;

a sharpening module that combines the texture image with the weighted image to obtain a sharpened image;

a contrast enhancement module that performs contrast enhancement on the sharpened image according to the environment illumination intensity and the contrast enhancement coefficient to obtain an enhanced image; and a second inverse color module that performs inverse color processing on the enhanced image to obtain an output image.

The presently disclosed low-illumination image processing method and device divide an input low-illumination image into different texture regions to obtain the texture and noise level parameter of the image. On one hand, a first filtering coefficient and a second filtering coefficient are determined according to the mean of the standard deviations of the gray scale of pixel points in various texture regions. Smoothing processing is performed on an inverse color image by adopting the first filtering coefficient and the second filtering coefficient, to obtain a first smoothing image and a second smoothing image respectively. Weighted averaging is performed on the first smoothing image and the second smoothing image according to the texture and noise level parameter to obtain a weighted image. An environment illumination intensity is estimated according to the dark channel image of the weighted image, and a contrast enhancement coefficient is calculated. On the other hand, a texture image is obtained by performing texture structure extraction on a gradient image of the inverse color image. Further, the texture image is combined with the weighted image to obtain a sharpened image; and contrast enhancement is performed on the sharpened image according to the contrast enhancement coefficient to obtain an enhanced image. Finally, inverse color processing is performed on the enhanced image to obtain an output image. Therefore, by using the disclosed low-illumination image processing method and device, the contrast of low-illumination image can be effectively enhanced, various types of noise can be filtered, and the image color and details can be retained at the same time to obtain a clear and vivid restored image.

DETAILED DESCRIPTION OF THE INVENTION

A low-illumination image processing method and device according to the present invention can be applied to a video monitoring system, image processing software, etc., and can effectively perform defogging processing and low-illumination enhancement processing. Noise reduction on the image can both filter Color noise and Luma noise of images, and retain the image color and details as much as possible at the same time.

The present invention is further described below in details by using specific implementation examples with reference to the attached schematic drawings.

Figure 1:
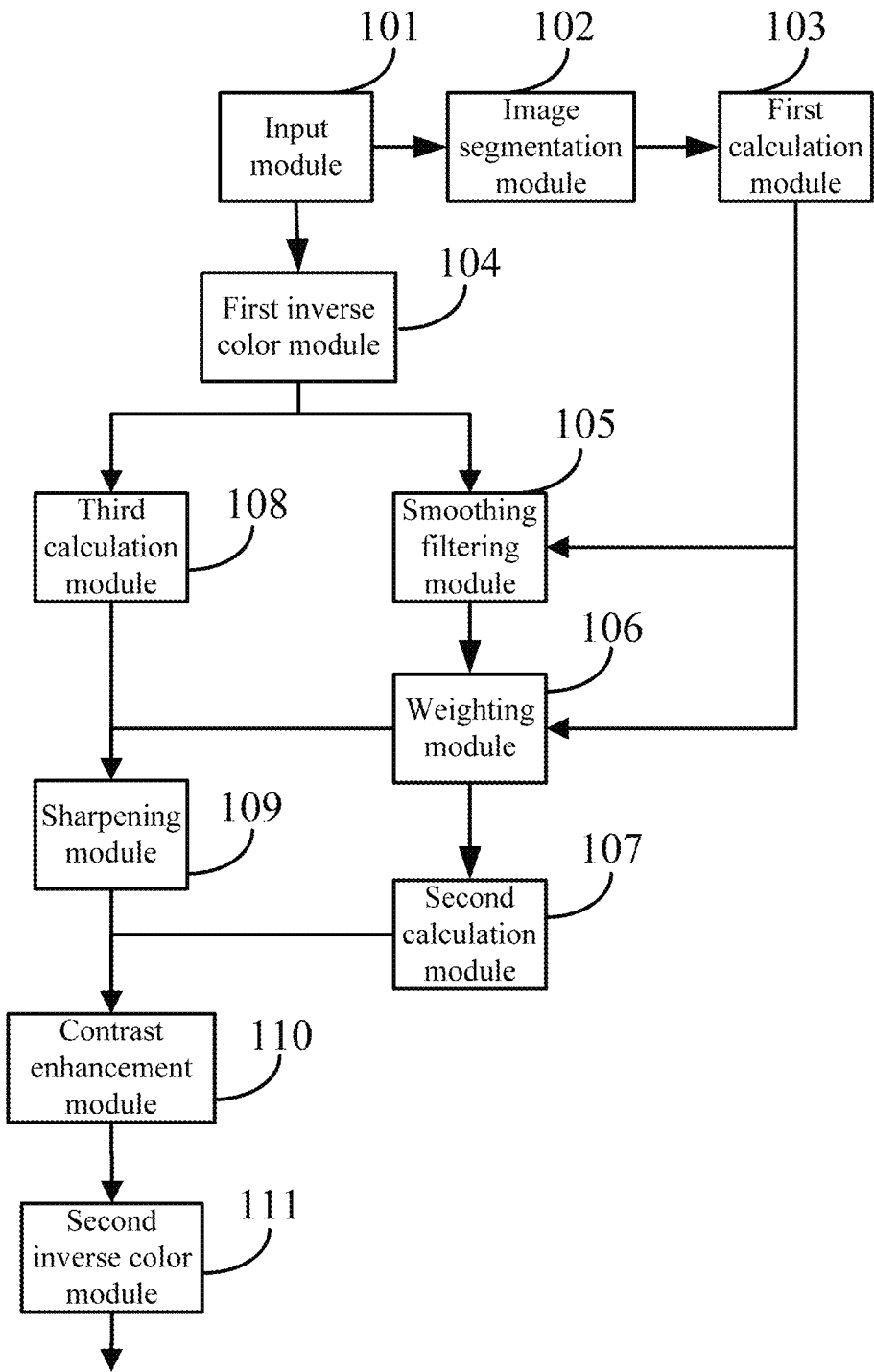
FIG. 1 illustrates a schematic view of a low-illumination image processing device according to some embodiments in the present invention.

FIG. 1 shows a low-illumination image processing method and device. The low-illumination image processing device includes an input module 101, an image segmentation module 102, a first calculation module 103, a first inverse color module 104, a smoothing filtering module 105, a weighting module 106, a second calculation module 107, a third calculation module 108, a sharpening module 109, a contrast enhancement module 110, and a second inverse color module 111.

Figure 2:
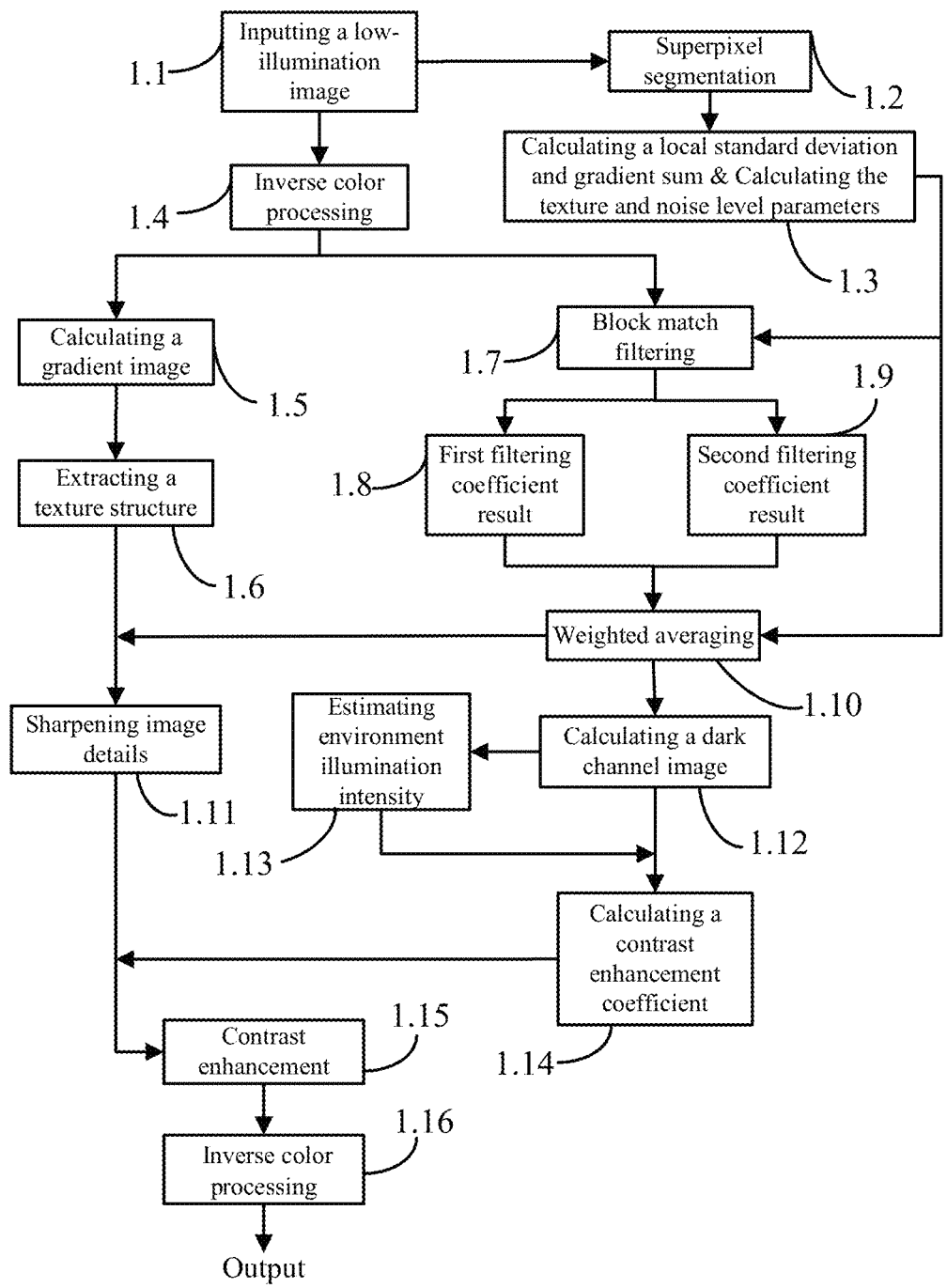
FIG. 2 illustrates a flowchart for a low-illumination image processing method according to some embodiments in the present invention.

The device is described in conjunction of a low-illumination image processing method in the following. Referring to FIG. 2, the low-illumination image processing method includes:

Step 1.1: an input module 101 inputs a low-illumination image I.

Step 1.2: an image segmentation module 102 divides low-illumination image I into different texture regions. Preferably, the image segmentation module 102 divides low-illumination image I into different texture regions by using superpixels.

Step 1.3: a first calculation module 103 calculates a local standard deviation σ and gradient sum s of the gray scale of pixel points in various texture regions, and calculates a ratio of the standard deviation σ and the gradient sum s as a texture and noise level parameter α of the image, that is, α=σ/s.

Step 1.4: a first inverse color module 104 performs inverse color processing on each color channel of the low-illumination image I to obtain an inverse color image R. The first inverse color module 104 performs inverse color processing on low-illumination image I using the formula R=255-I. The inverse color processing on low-illumination image I is computed first, followed by subsequent processing to convert the low-illumination pixels in the image into high-illumination pixels, thereby facilitating the contrast enhancement processing to the low-illumination regions.

Step 1.5: a third calculation module 108 conducts convolution by using the differential operator and the three-color channels of R respectively to obtain the gradient image Rd of R.

Step 1.6: a third calculation module 108 performs the texture structure extraction on Rds by using the proper filtering coefficient to obtain the noise-free main texture image Rds of Rd, wherein an empirical value can be chosen for the filtering coefficient.

Step 1.7: a smoothing filtering module 105 performs smoothing processing on an inverse color image by using the first filtering coefficient and the second filtering coefficient, respectively. In some embodiments, the inverse color image is smoothed with a Three-dimensional Block Matching (BM3D) filter. A BM3D image filter is used, various types of noise in the image can be filtered, and the image texture details can be retained as much as possible at the same time. Preferably, the first filtering coefficient is greater than the mean of the standard deviations a of the gray scale of pixel points in various texture regions, and the second filtering coefficient is less than the mean of the standard deviations a of the gray scale of pixel points in various texture regions.

Step 1.8: in some embodiments, a smoothing filtering module 105 obtains a first smoothing image $R_s^{coarse}$ with smooth texture by using twice the mean of σ as the first filtering coefficient.

Step 1.9: a smoothing filtering module 105 obtains a second smoothing image $R_s^{fine}$ with a more prominent texture by using ½ of the mean of σ as the second filtering coefficient.

In some embodiments, the first filtering coefficient and the second filtering coefficient may be selected according to actual requirements, and other filters may be selected for the smoothing filtering module 105 to perform smoothing processing on the inverse color image.

Step 1.10: a weighting module 106 calculates weighted averaging on a first smoothing image and a second smoothing image after filtering processing according to the texture and noise level parameter α to obtain a weighted image. In some embodiments, the weighted image Rs is obtained by the following formula:

$$R_s = \alpha \cdot R_s^{fine} + (1-\alpha) \cdot R_s^{coarse}.$$

In Step 1.7-1.10, a noise suppression filter is additionally arranged before an operation of contrast enhancement to solve the problem of noise amplification existing in original low-illumination image contrast enhancement techniques.

Step 1.11: a sharpening module 109 combines the texture image with the weighted image to obtain a sharpened image. In some embodiments, the sharpened image Rsharp with enhanced details is obtained by using the following formula:

$$R{sharp} = Rs + \alpha * Rds.$$

Better sharpening effect can be achieved through the weighted sum, while avoiding excessive edge enhancement.

In Steps 1.6, 1.7 and 1.11, the noise in the gradient image is removed, the key structure information is retained, the image is sharpened with the structure information, and the image details are enhanced.

Step 1.12: a second calculation module 107 calculates a dark channel image Rdark of the weighted image. The dark channel image is a gray image composed of the color channel with the minimum gray scale of the three-color channels on each pixel point of the image.

In some embodiments, the dark channel image is calculated by using the following formula:

$$R_{dark}(x) = \min_{y \in \Omega(x)} \left( \min_{c \in \{r,g,b\}} R^c(y) \right),$$

wherein x and y represent the position of the pixel point, Ω (x) is the neighborhood centered on pixel x, and c represents various color channels. In particular, Ω (x) is a neighborhood with a size of 3*3 centered on pixel x.

Step 1.13: a second calculation module 107 estimates environment illumination intensity A according to the dark channel image.

In some embodiments, the pixels in the Rdark are ranked by the gray scale in descending order. Find the top 0.2% pixel points. The mean of gray scales of the three-color channels of pixel points in the weighted image is calculated. Find the pixel point with the maximum mean. The pixel value of this pixel point (gray scales of the three-color channels) is taken as the estimated value of the environment illumination intensity A.

Step 1.14: a second calculation module 107 calculates a contrast enhancement coefficient t according to the dark channel image and the environment illumination intensity. In some embodiments, the following calculation formula is used:

$$t(x) = 1 - \omega * \min_{y \in \Omega(x)} \left( \min_{c \in \{r,g,b\}} \frac{R^c(y)}{A^c} \right),$$

wherein x and y represent the position of the pixel point, t(x) is the contrast enhancement coefficient, Ω (x) is the neighborhood centered on pixel x, c represents various color channels, ω is the weighted correction coefficient, Rc(y) is the luminance value of the yth pixel point in c channel, and A is the environment illumination intensity. In particular, Ω (x) is a 3*3 sized neighborhood centered at the pixel x.

In order to avoid the problem of excessive contrast enhancement and insufficient enhancement, in some embodiments, the coefficient w is adjusted adaptively according to the illumination of the three RGB channels of the pixel point (i.e. brightness of the pixel point) by using the following formula:

$$\omega(x) = \left(1 - 10^{-\frac{\sqrt{\sum_{c \in \{r,g,b\}}(255 - I_c(x))}}{3}}\right)^2,$$

wherein ω(x) is the weighted correction coefficient of the xth pixel point. Ic(x) is the gray scale of the xth pixel point in the c channel.

In some embodiments, a fixed value may be also taken for ω, such as 0.85.

In general, the low-illumination image enhancement using t(x) calculated by using the above formula will be invalid in very low illumination regions, resulting in insufficient enhancement. Therefore, after the contrast enhancement coefficient t (x) is obtained according to the above formula, simple correction shall be performed, in particular: further reducing the enhancement coefficient that is less than the pre-set value. In some embodiments, the correction formula is as follows:

$$t(x) = \begin{cases} 2t^2(x), & 0 < t(x) < 0.5 \\ t(x), & 0.5 < t(x) < 1 \end{cases}.$$

In some embodiments, other correction formulas may also be adopted.

Step 1.15: a contrast enhancement module 110 performs contrast enhancement on the sharpened image according to environment illumination intensity and contrast enhancement coefficient to obtain an enhanced image, that is, removing the atmosphere illumination from the sharpened image and restoring it to a clear enhanced image Rclear, In some embodiments, the following restoring formula is adopted:

$$R_{clear} = \frac{R_{sharp} - A}{t} + A.$$

Step 1.16: A second inverse color module 111 performs inverse color processing on each color channel of the enhanced image to obtain an output image J. The second inverse color module 111 performs inverse color processing on the enhanced image Rclear by the formula J=255−Rclear.

Figures 3A, 3B, 3C:
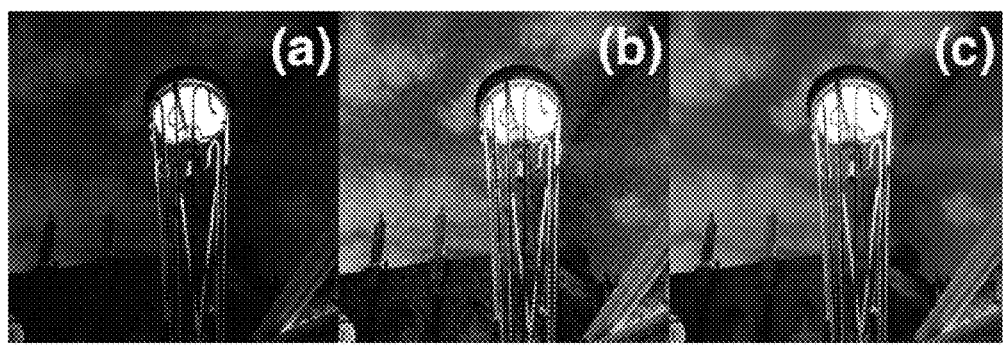
FIG. 3(a)-3(c) illustrate comparisons of images obtained by processing a same input image using a conventional low-illumination image processing method and a presently disclosed method.

Referring to FIG. 3(a)-3(c), FIG. 3(a) illustrates the input low-illumination image. FIG. 3(b) illustrates the output image obtained after direct contrast enhancement by using the traditional methods. FIG. 3(c) illustrates the output image obtained by using the presently disclosed low-illumination image processing method. FIG. 3(c) shows that the output image obtained by presently disclosed the low-illumination image processing method features less noise, and the image color and details can be retained at the same time It will be understood by those skilled in the field that all or part of steps of various methods according to the above embodiments may be programmed to instruct the associated hardware to achieve the goals, which may be stored in a readable storage medium of computer, e.g. read-only memory, random access memory, disk or CD.

The above contents are further detailed description of the present invention in connection with the disclosed embodiments. The invention is not limited to the embodiments referred to, but may be varied and modified by those skilled in the field without departing from the idea and scope of the present invention.

What is claimed is:

1. A low-illumination image processing method, comprising:
inputting a low-illumination image;
dividing the low-illumination image into different texture regions, calculating a local standard deviation and a gradient sum of the gray scale of pixel points in various texture regions, and calculating a ratio of the local standard deviation and the gradient sum as a texture and noise level parameter of the image;
performing inverse color processing on the low-illumination image to obtain an inverse color image;
determining a first filtering coefficient and a second filtering coefficient according to the mean of the standard deviations of the gray scale of pixel points in various texture regions, and performing smoothing processing on an inverse color image by adopting the first filtering coefficient and the second filtering coefficient to obtain a first smoothing image and a second smoothing image respectively;
performing weighted averaging on the first smoothing image and the second smoothing image according to the texture and noise level parameter to obtain a weighted image;
calculating a dark channel image of the weighted image, and estimating an environment illumination intensity according to the dark channel image;
calculating a contrast enhancement coefficient according to the dark channel image and environment illumination intensity;
calculating a gradient image of the inverse color image, and extracting texture structure from the gradient image of the inverse color image to obtain a texture image;
combining the texture image with the weighted image to obtain a sharpened image; and
performing contrast enhancement on the sharpened image according to the environment illumination intensity and the contrast enhancement coefficient to obtain an enhanced image; and
performing inverse color processing on the enhanced image to obtain an output image.

2. A method according to claim 1, wherein the low-illumination image is divided into different texture regions by using superpixel segmentation.

3. The method of claim 1, wherein smoothing processing is performed by using a Three-dimensional Block Matching (BM3D) filter on an inverse color image by adopting the first filtering coefficient and the second filtering coefficient to obtain the first smoothing image and the second smoothing image respectively, wherein the first filtering coefficient is greater than the mean of the standard deviations of the gray scale of pixel points in various texture regions, wherein the second filtering coefficient is less than the mean of the standard deviations of the gray scale of pixel points in various texture regions.

4. The method of claim 1, further comprising:
correcting the contrast enhancement coefficient by reducing the contrast enhancement coefficient that is less than the pre-set value.

5. A low-illumination image processing device, comprising:
an input module configured to input a low-illumination image;
an image segmentation module configured to divide the low-illumination image into different texture regions;
a first calculation module configured to calculate a local standard deviation and a gradient sum of the gray scale of pixel points in various texture regions, and to calculate a ratio of the standard deviation and the gradient sum as a texture and noise level parameter of the image;
a first inverse color module configured to perform inverse color processing on the low-illumination image to obtain an inverse color image;
a smoothing filtering module configured to determine a first filtering coefficient and a second filtering coefficient according to a mean of the standard deviations of the gray scale of pixel points in various texture regions, and to perform smoothing processing on an inverse color image by adopting a first filtering coefficient and a second filtering coefficient to obtain a first smoothing image and a second smoothing image respectively;
a weighting module configured to perform weighted averaging on the first smoothing image and the second smoothing image according to the texture and noise level parameter to obtain a weighted image;
a second calculation module configured to calculate a dark channel image on the weighted image, and to estimate an environment illumination intensity according to the dark channel image; and to calculate a contrast enhancement coefficient according to the dark channel image and environment illumination intensity;
a third calculation module configured to calculate a gradient image on the inverse color image, and performing texture structure extraction on the gradient image of the inverse color image to obtain a texture image;
a sharpening module configured to combine the texture image with the weighted image to obtain a sharpened image;
a contrast enhancement module configured to perform contrast enhancement on the sharpened image according to the environment illumination intensity and the contrast enhancement coefficient to obtain an enhanced image; and
a second inverse color module configured to perform inverse color processing on the enhanced image to obtain an output image.

6. The device of claim 5, wherein an image segmentation module is configured to divide the low-illumination image into different texture regions by using superpixel segmentation.

7. The device of claim 5, wherein the smoothing filtering module is configured to perform smoothing processing by using a Three-dimensional Block Matching (BM3D) filter on an inverse color image by adopting the first filtering coefficient and the second filtering coefficient to obtain the first smoothing image and the second smoothing image respectively, wherein the first filtering coefficient is greater than the mean of the standard deviations of the gray scale of pixel points in various texture regions, wherein the second filtering coefficient is less than the mean of the standard deviations of the gray scale of pixel points in various texture regions.

8. The device of claim 7, wherein the weighting module is configured to perform weighted averaging on the first smoothing image and the second smoothing image according to the texture and noise level parameter to obtain a weighted image by using the following formula:

$$R_s = \alpha \cdot R_s^{fine} + (1-\alpha) \cdot R_s^{coarse},$$

wherein Rs is a weighted image, $R_s^{coarse}$ is a first smoothing image, $R_s^{fine}$ is a second smoothing image, and $\alpha$ is the texture and noise level parameter.

9. The device of claim 8, wherein the sharpening module is configured to combine the texture image with the weighted image to obtain a sharpened image by using the following formula: $R_{sharp}=R_s+\alpha*R_{ds}$, wherein $R_{sharp}$ is a sharpened image, and $R_{ds}$ is a texture image.

10. The device of claim 5, wherein the second calculation module is configured to calculate a contrast enhancement coefficient according to dark channel image and environment illumination intensity by using the following formula:

$$t(x) = 1 - \omega * \min_{y \in \Omega(x)} \left( \min_{c \in [r,g,b]} \frac{R^c(y)}{A^c} \right),$$

wherein x and y represent the position of the pixel point, t(x) is the contrast enhancement coefficient, $\Omega(x)$ is the neighborhood centered on pixel x, c represents various color channels, $\omega$ is the weighted correction coefficient, $R^c(y)$ is the luminance value of the $y^{th}$ pixel point in c channel, and A is the environment illumination intensity.

11. The device of claim 10, wherein the second calculation module is further configured to adjust the weighted correction coefficient adaptively according to the illumination of the three RGB channels of the pixel by the following formula:

$$\omega(x) = \left(1 - 10^{-\frac{\sqrt{\Sigma_{c \in [r,g,b]}(255-I_c(x))}}{3}}\right)^2,$$

wherein $\omega(x)$ is the weighted correction coefficient of the $x^{th}$ pixel point. $I_c(x)$ is the gray scale of the $x^{th}$ pixel point in the c channel.

12. The device of claim 5, wherein the second calculation module is further configured to correct the contrast enhancement coefficient by reducing the contrast enhancement coefficient that is less than the pre-set value.

13. The device of claim 12, wherein the second calculation module is further configured to correct the contrast enhancement coefficient by using the following formula:

$$t(x) = \begin{cases} 2t^2(x), & 0 < t(x) < 0.5 \\ t(x), & 0.5 < t(x) < 1 \end{cases},$$

wherein t(x) is a contrast enhancement coefficient.

* * * * *